(12) United States Patent
Abe et al.

(10) Patent No.: US 9,790,845 B2
(45) Date of Patent: Oct. 17, 2017

(54) INTERNAL COMBUSTION ENGINE

(71) Applicant: TOYOTA JIDOSHA KABUSHIKI KAISHA, Toyota-shi, Aichi-ken (JP)

(72) Inventors: Kazuyoshi Abe, Susono (JP); Yasushi Yoshihara, Mishima (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 0 days.

(21) Appl. No.: 15/067,575

(22) Filed: Mar. 11, 2016

(65) Prior Publication Data
US 2016/0265420 A1    Sep. 15, 2016

(30) Foreign Application Priority Data

Mar. 12, 2015   (JP) ................................ 2015-050082

(51) Int. Cl.
| | | |
|---|---|---|
| F02B 31/08 | (2006.01) | |
| F02B 31/00 | (2006.01) | |
| F02B 23/10 | (2006.01) | |

(52) U.S. Cl.
CPC .............. *F02B 31/00* (2013.01); *F02B 23/10* (2013.01); *F02B 2023/106* (2013.01); *Y02T 10/125* (2013.01); *Y02T 10/146* (2013.01)

(58) Field of Classification Search
CPC .......... F02B 31/00; F02B 31/02; F02B 31/08; F02B 31/085; F02B 23/10; F02B 2023/106; F02B 2023/107; F02B 2023/108; Y02T 10/125; Y02T 10/146
USPC ....................................... 123/302, 306, 308
See application file for complete search history.

(56) References Cited

U.S. PATENT DOCUMENTS

| | | | |
|---|---|---|---|
| 5,245,964 A | 9/1993 | Matsuo et al. | |
| 5,417,190 A * | 5/1995 | Ando | F02B 17/00 |
| | | | 123/308 |
| 5,878,712 A * | 3/1999 | Wolters | F02B 23/105 |
| | | | 123/301 |
| 6,173,690 B1 * | 1/2001 | Iriya | F02B 17/005 |
| | | | 123/295 |
| 7,032,560 B2 * | 4/2006 | Katou | F02B 31/08 |
| | | | 123/193.5 |

(Continued)

FOREIGN PATENT DOCUMENTS

| | | |
|---|---|---|
| JP | H04-137224 U | 12/1992 |
| JP | H07-279751 A | 10/1995 |

(Continued)

*Primary Examiner* — Hai Huynh
(74) *Attorney, Agent, or Firm* — Andrews Kurth Kenyon LLP (57) ABSTRACT

With regard to an internal combustion engine having a tumble flow formed in a cylinder, an object of the invention is to intensify the tumble flow. There is provided an internal combustion engine having a pent-roof type combustion chamber. In a predetermined area in the vicinity of an opening of an intake port to a combustion chamber, an upper wall surface of the intake port is extended approximately linearly while being inclined to an intake port-side ceiling surface more downward than a normal direction of the intake port-side ceiling surface in a side view. In a partial area in the predetermined area of the intake port, a distance between lateral wall surfaces on a left side and on a right side of the intake port is gradually increased toward downstream in a top view.

4 Claims, 7 Drawing Sheets

(56) References Cited

U.S. PATENT DOCUMENTS

| | | | | |
|---|---|---|---|---|
| 7,051,702 | B2 * | 5/2006 | Sakai | F02B 23/08 123/188.14 |
| 7,128,050 | B1 * | 10/2006 | Abe | F02B 31/06 123/188.14 |
| 7,637,244 | B2 * | 12/2009 | Akazaki | F02B 31/06 123/188.14 |
| 7,802,555 | B2 * | 9/2010 | Maeda | F02B 23/104 123/306 |
| 7,958,863 | B2 * | 6/2011 | Abe | F02B 31/06 123/306 |
| 8,127,742 | B2 * | 3/2012 | Nogawa | F02B 27/02 123/184.53 |
| 8,245,688 | B2 * | 8/2012 | Uda | F02B 31/06 123/184.56 |
| 8,430,074 | B2 * | 4/2013 | McCarthy | F02B 31/085 123/188.14 |
| 8,997,713 | B2 * | 4/2015 | Nakajima | F02B 31/085 123/188.14 |

FOREIGN PATENT DOCUMENTS

| | | |
|---|---|---|
| JP | 2004-144071 A | 5/2004 |
| JP | 2005-061368 A | 3/2005 |
| JP | 2010-185408 A | 8/2010 |

* cited by examiner

LATERAL DIRECTION

INTERNAL COMBUSTION ENGINE

BACKGROUND OF THE INVENTION

Field of the Invention

The present invention relates to an internal combustion engine.

Description of the Related Art

With regard to a cylinder of an internal combustion engine, a conventionally known technique forms a tumble flow that is a swirl flow in an axial direction of the cylinder. Formation of the tumble flow in the cylinder promotes mixing of the intake air with a fuel and thereby enhances the combustibility in the internal combustion engine.

Patent Literature 1 discloses a configuration of an intake port in the internal combustion engine having the tumble flow formed in the cylinder. According to this proposed configuration, when the intake port is divided into a cylinder center-side intake port area (upper area in the intake port in a side view of the intake port and the cylinder) which is an area on the cylinder center side and a cylinder outer peripheral-side intake port area (lower area in the intake port in the side view of the intake port and the cylinder) which is an area other than the cylinder center-side intake port area, the port radius of the cylinder outer peripheral-side intake port area is gradually varied in a neighborhood of an opening of the intake port to a combustion chamber. More specifically, an intake port expanded portion and an intake air adjusting portion are formed in the cylinder outer peripheral-side intake port area of the intake port. In the intake port expanded portion, the port radius of the cylinder outer peripheral-side intake port area is increased from upstream toward a location immediately upstream of the opening of the intake port to the combustion chamber in the neighborhood of the opening of the intake port to the combustion chamber. The intake air adjusting portion is, on the other hand, provided downstream of the intake port expanded portion to be extended to the opening of the intake port to the combustion chamber. In the intake air adjusting portion, the port radius of the cylinder outer peripheral-side intake port area is decreased from upstream toward the opening of the intake port to the combustion chamber. This intake air adjusting portion causes part of the flow of the intake air to be guided to the center of the intake port.

Patent Literatures 2 and 3 disclose other configurations of the intake port in the internal combustion engine having the tumble flow formed in the cylinder.

CITATION LIST

Patent Literature

Patent Literature 1: Japanese Patent Application Laid-Open No. 2005-061368A
Patent Literature 2: Japanese Patent Application Laid-Open No. 2010-185408A
Patent Literature 3: Japanese Patent Application Laid-Open No. 2004-144071A

SUMMARY OF THE INVENTION

Technical Problem

With regard to an internal combustion engine having a tumble flow formed in a cylinder, an object of the invention is to intensity the tumble flow.

Solution to Problem

According to an aspect of the invention, there is provided an internal combustion engine comprising a pent-roof type combustion chamber in which an intake port-side ceiling surface with an opening of an intake port and an exhaust port-side ceiling surface with an opening of an exhaust port are inclined to a plane that is perpendicular to a center axis of a cylinder. A tumble flow is formed in the cylinder to cause a gas to flow in a direction from the exhaust port-side ceiling surface toward a top face of a piston in a neighborhood of a bore wall surface on an exhaust port side and to flow in a direction from the top face of the piston toward the intake port-side ceiling surface in a neighborhood of a bore wall surface on an intake port side. An upper wall surface of the intake port is extended approximately linearly while being inclined to the intake port-side ceiling surface more downward than a normal direction of the intake port-side ceiling surface in a side view, in a predetermined area in vicinity of an opening of the intake port to the combustion chamber. A distance between lateral wall surfaces on a left side and on a right side of the intake port is gradually increased toward downstream in a top view, in a partial area in the predetermined area of the intake port.

In the description herein, a cylinder head side relative to a cylinder block is defined as an upper side, and a cylinder block side relative to a cylinder head is defined as a lower side. In the description herein, a direction that is perpendicular to the axial direction of the intake port and is parallel to the radial direction of the cylinder is defined as a lateral direction. In the description herein, a relatively upper portion of a wall surface of the intake port that includes a portion of the wall surface of the intake port located immediately above the center axis of the intake port is called "upper wall surface". Relatively lateral portions of the wall surface of the intake port that respectively include portions of the wall surface of the intake port located just beside the center axis of the intake port are called "lateral wall surfaces".

In the internal combustion engine of the above aspect, in the predetermined area in the vicinity of the opening of the intake port to the combustion chamber, the upper wall surface is extended approximately linearly while being inclined to the intake port-side ceiling surface more downward than the normal direction of the intake port-side ceiling surface in the side view. This configuration makes the intake air flowing along the upper wall surface of the intake port in the vicinity of the opening of the intake port to the combustion chamber and flowing into the cylinder more likely to flow toward the exhaust port side in an upper portion in the cylinder. This accordingly increases the flow rate of the intake air flowing toward the exhaust port side in the upper portion in the cylinder.

Additionally, in the internal combustion engine of the above aspect, in the partial area in the predetermined area of the intake port, the distance between the lateral wall surfaces on the left side and on the right side of the intake port is gradually increased toward downstream in the top view. This configuration makes the flow of the intake air flowing from the intake port into the cylinder more likely to be spread in the lateral direction in the upper portion in the cylinder. For example, in a configuration that the distance between the lateral wall surfaces on the left side and on the right side of the intake port is gradually expanded to a bore wall surface side located in the lateral direction of the cylinder (hereinafter may be referred to as "lateral bore wall surface") toward downstream, the intake air flowing from the intake port into the cylinder is more likely to flow toward the lateral bore wall surface side in the upper portion in the cylinder. This configuration increases the flow rate of the intake air that flows through the vicinity of the lateral bore wall surface toward the exhaust port side (hereinafter may be referred to as "bore wall surface-side intake air") in the upper portion in the cylinder. In another example, in a configuration that the distance between the lateral wall surfaces on the left side and on the right side of the intake port is gradually expanded to a cylinder center side toward downstream, the intake air flowing from the intake port into the cylinder is more likely to flow toward the cylinder center side in the upper portion in the cylinder. This configuration increases the flow rate of the intake air that flows through the vicinity of the cylinder center toward the exhaust port side (hereinafter may be referred to as "cylinder center-side intake air") in the upper portion in the cylinder.

The configuration of this aspect of the invention can increase the flow rate of the intake air flowing toward the exhaust port side in the upper portion in the cylinder over a wider range in the lateral direction in the cylinder. Increasing the flow rate of the intake air flowing toward the exhaust port side in the upper portion in the cylinder results in increasing the flow rate of gas in a direction from the exhaust port-side ceiling surface toward the top face of the piston in the vicinity of the bore wall surface on the exhaust port side. Accordingly, this configuration can intensify the tumble flow formed in the cylinder.

In the internal combustion engine of the above aspect, a distance between each of the lateral wall surfaces on the left side and on the right side of the intake port and a center axis of the intake port may be gradually increased toward downstream in the top view, in the partial area in the predetermined area of the intake port. In this configuration, the distance between the lateral wall surfaces on the left side and on the right side of the intake port is gradually expanded to both the lateral bore wall surface side and the cylinder center side toward downstream. This makes the intake air flowing from the intake port into the cylinder more likely to flow both toward the lateral bore wall surface side and toward the cylinder center side in the upper portion in the cylinder. This accordingly increases both the flow rate of the bore wall surface-side intake air and the flow rate of the cylinder center-side intake air.

Additionally, increasing both the flow rate of the bore wall surface-side intake air and the flow rate of the cylinder center-side intake air causes these two intake air flows to collide with each other at a location closer to the bore wall surface on the exhaust port side in the upper portion in the cylinder. This forms the gas flow in the direction from the exhaust port-side ceiling surface toward the top face of the piston at the location closer to the bore wall surface on the exhaust port side. As a result, this makes the gas flow going from the intake port side via the exhaust port-side ceiling surface toward the top face of the piston in the tumble flow formed in the cylinder more likely to flow along the bore wall surface. This further expands the size of the vortex of the tumble flow formed in the cylinder. This can accordingly further intensity the tumble flow.

In the internal combustion engine of the above aspect, a valve contact surface which a valve element of an intake valve comes into contact with in a closed position of the intake valve may be formed at the opening of the intake port to the combustion chamber. The predetermined area of the intake port may be an area that is extended continuously from an upstream side end of the valve contact surface toward upstream, and the partial area may be an area that is extended continuously from the upstream side end of the valve contact surface toward upstream in the predetermined area. In this configuration, the predetermined area and the partial area are located as close as to the opening of the intake port. This further enhances the effect of guiding the intake air flowing from the intake port into the cylinder by the upper wall surface and the lateral wall surface described above. Accordingly this further increases the flow rate of the bore wall surface-side intake air and the flow rate of the cylinder center-side intake air in the upper portion in the cylinder.

Advantageous Effects of Invention

The above aspects of the invention intensify the tumble flow in the internal combustion engine having the tumble flow formed in the cylinder.

Further features of the present invention will become apparent from the following description of exemplary embodiments with reference to the attached drawings.

BRIEF DESCRIPTION OF THE DRAWINGS

FIG. 6A illustrates the flow of the intake air in the internal combustion engine employing the different configuration from that of the embodiment; and FIG. 6B illustrates the flow of the intake air in the internal combustion engine according to the embodiment;

FIG. 7A illustrates the distribution of the flow rate of the intake air in the internal combustion engine employing the configuration shown in FIG. 6A; and FIG. 7B illustrates the distribution of the flow rate of the intake air in the internal combustion engine according to the embodiment;

DESCRIPTION OF THE EMBODIMENTS

The following describes concrete embodiments of the invention with reference to the drawings. The dimensions, the materials, the shapes, the positional relationships and the like of the respective components described in the following embodiments are only for the purpose of illustration and not intended at all to limit the scope of the invention to such specific descriptions.

Embodiment 1

Figure 1:
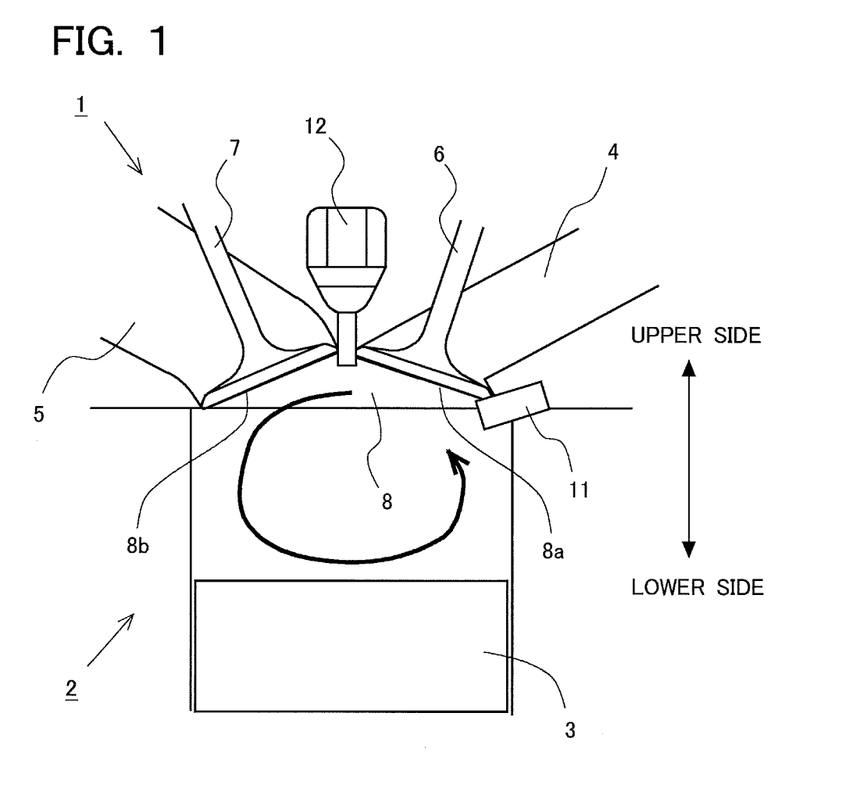
FIG. 1 is a diagram illustrating the schematic configuration of an internal combustion engine according to an embodiment.

FIG. 1 is a diagram illustrating the schematic configuration of an internal combustion engine 1 according to an embodiment. The internal combustion engine 1 is a gasoline engine for vehicle driving having four cylinders 2 (spark-ignition internal combustion engine). The invention is, however, not limited to the gasoline engine but is also applicable to another engine. As a matter of convenience, FIG. 1 illustrates only one cylinder 2.

A piston 3 is provided to be slidable in the cylinder 2. The cylinder 2 has a combustion chamber 8 that is connected with intake ports 4 and exhaust ports 5 provided in a cylinder head. Although two intake ports 4 and two exhaust ports 5 are connected with each cylinder 2, only one intake port 4 and only one exhaust port 5 are illustrated in FIG. 1 as a matter of convenience. The combustion chamber 8 is a pent-roof type combustion chamber in which an intake port-side ceiling surface 8a with openings of the intake ports 4 and an exhaust port-side ceiling surface 8b with openings of the exhaust ports 5 are inclined to a plane that is perpendicular to the center axis of the cylinder 2.

The opening of each intake port 4 to the combustion chamber 8 (hereinafter simply referred to as "opening of the intake port 4") is opened and closed by an intake valve 6. The opening of each exhaust port 5 to the combustion chamber 8 is opened and closed by an exhaust valve 7. The cylinder 2 is also equipped with a fuel injection valve 11 that is configured to directly inject a fuel into the combustion chamber 8 and an ignition plug 12 that is configured to ignite the air-fuel mixture produced in the combustion chamber 8.

An arrow in FIG. 1 indicates the flow of the gas (intake air) in the cylinder 2. As shown by this arrow, according to this embodiment, the gas forms a tumble flow in the cylinder 2. The tumble flow is a swirl flow of the gas swirling in an axial direction of the cylinder 2, and flows in a direction from the exhaust port-side ceiling surface 8b toward a top face of the piston 3 in the vicinity of a bore wall surface on the exhaust port side and flows in a direction from the top face of the piston 3 toward the intake port-side ceiling surface 8a in the vicinity of a bore wall surface on the intake port side. Formation of such a tumble flow accelerates mixing the fuel with the air and thereby enhances the combustibility in the internal combustion engine 1.

In the description below, a cylinder head side relative to a cylinder block is defined as an upper side, and a cylinder block side relative to a cylinder head is defined as a lower side. A direction that is perpendicular to the axial direction of the intake port 4 and is parallel to the radial direction of the cylinder 2 (i.e., a direction in which the openings of the two intake ports 4 are aligned in the intake port-side ceiling surface 8a of the combustion chamber 8) is defined as a lateral direction.

(Configuration of Intake Port)

Figure 2:
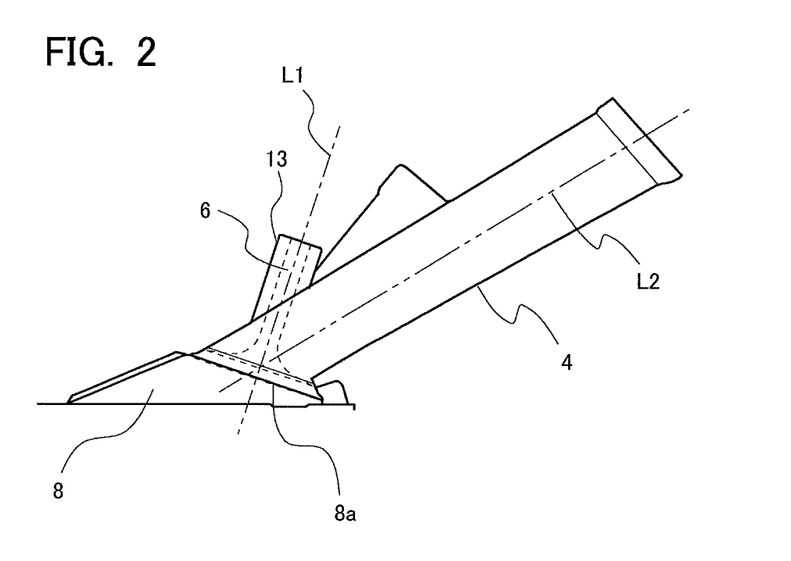
FIG. 2 is a side view illustrating an intake port according to the embodiment.
Figure 3:
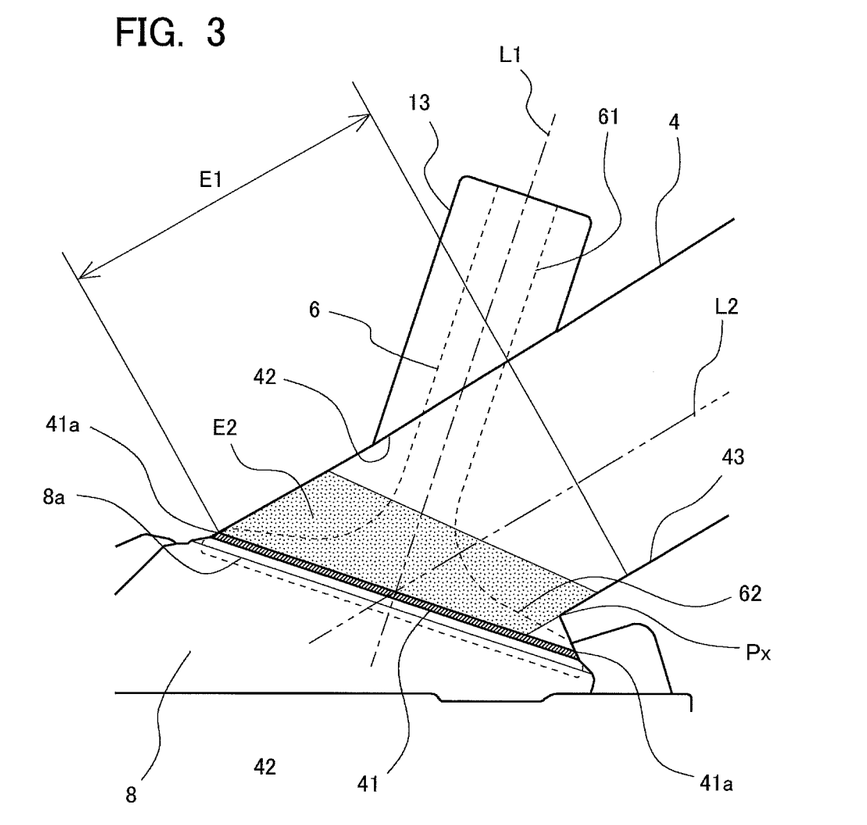
FIG. 3 is a side view illustrating peripheral part of the opening of the intake port according to the embodiment.
Figure 4:
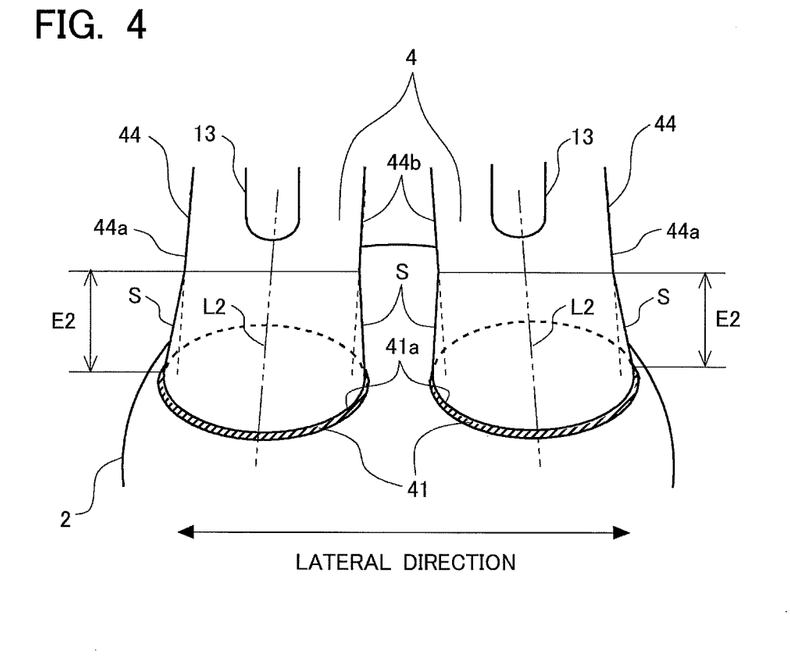
FIG. 4 is a top view illustrating peripheral part of the openings of the intake ports according to the embodiment.

The following describes the configuration of the intake port of the internal combustion engine according to this embodiment with reference to FIGS. 2 to 4. FIG. 2 is a side view illustrating the intake port. FIG. 3 is a side view illustrating peripheral part of the opening of the intake port. FIG. 4 is a top view illustrating peripheral part of the openings of the intake ports.

As shown in FIG. 2, the intake port 4 of this embodiment is a so-called straight port that is formed in a shape extended approximately linearly from the periphery of the opening toward upstream. The intake port 4 has a center axis L2 that is inclined to the intake port-side ceiling surface 8a more downward than a normal direction L1 of the intake port-side ceiling surface 8a. A stem guide 13 which a stem portion 61 of the intake valve 6 is inserted through is provided in the vicinity of the opening of the intake port 4. The opening of the intake port 4 has a valve contact surface 41 which a valve element 62 of the intake valve 6 comes into contact with, in a closed position of the intake valve 6. The valve contact surface 41 is a surface defined to include a surface which the valve element 62 of the intake valve 6 actually comes into contact with, in the closed position of the intake valve 6 and is formed in a ring shape at the opening of the intake port 4. In FIGS. 3 and 4, a hatched area indicate the valve contact surface 41. As shown in FIGS. 3 and 4, the valve contact surface 41 has an upstream side end 41a.

A relatively upper portion of a wall surface of the intake port 4 that includes a portion of the wall surface of the intake port 4 located immediately above the center axis L2 of the intake port 4 is called "upper wall surface 42". A relatively lower portion of the wall surface of the intake port 4 that includes a portion of the wall surface of the intake port 4 located immediately below the center axis L2 of the intake port 4 is called "lower wall surface 43". Relatively lateral portions of the wall surface of the intake port 4 that respectively include portions of the wall surface of the intake port 4 located just beside the center axis L2 of the intake port 4 are called "lateral wall surfaces 44". In the following description, a lateral wall surface located on the outer side of the cylinder 2 in the lateral direction out of the lateral wall surfaces 44 on the left side and on the right side of the intake port 44 may be called "outer side wall surface 44a", and a lateral wall surface located on the center side of the cylinder 2 may be called "center side wall surface 44b".

As shown in FIG. 3, according to this embodiment, in a predetermined first area El that is extended continuously from the upstream side end 41a of the valve contact surface 41 of the intake port 4 toward upstream, the upper wall surface 42 of the intake port 4 is extended approximately linearly while being inclined to the intake port-side ceiling surface 8a more downward than the normal direction L1 of the intake port-side ceiling surface 8a in the side view. According to this embodiment, an area from the upstream side end 41a of the valve contact surface 41 of the intake port 4 to a location where the stem guide 13 is provided is defined as the predetermined first area E1. The upper wall surface 42 may be extended approximately linearly to upstream of the predetermined first area E1. For example, the upper wall surface 42 may be extended approximately linearly in the entire area upstream of the upstream side end 41a of the valve contact surface 41 of the intake port 4. The lower wall surface 43 of the intake port 4 is, on the other hand, formed to rise from the upstream side end 41a of the valve contact surface 41 to a predetermined position Px and is extended from the predetermined position Px approximately linearly while being inclined to the intake port-side ceiling surface 8a in an opposite direction to the exhaust port side, like the upper wall surface 42.

An area that is a partial area of the predetermined first area E1 in the intake port 4 and that is extended continuously from the upstream side end 41a of the valve contact surface 41 toward upstream is defined as a predetermined second area E2. According to this embodiment, as shown in FIG. 4, the lateral wall surface 44 in the predetermined second area E2 of the intake port 4 has an inclined portion S that is formed by inclining the lateral wall surface 44 to the center axis L2 of the intake port 4 in the top view. The inclined portion S of the outer side wall surface 44a is formed by inclining the outer side wall surface 44a to the center axis L2 of the intake port 4 outward of the cylinder 2 from upstream to downstream. The inclined portion S of the center side wall surface 44b is formed, on the other hand, by inclining the center side wall surface 44b to the center axis L2 of the intake port 4 inward of the cylinder 2 from upstream to downstream. In other words, in the predetermined second area E2 of the intake port 4, the distance between each of the lateral wall surfaces 44 (i.e., the outer side wall surface 44a and the center side wall surface 44b) on the left side and on the right side of the intake port 4 and the center axis L2 of the intake port 4 is gradually increased toward downstream in the top view. In the predetermined second area E2 of the intake port 4, the distance between the lateral wall surfaces 44 on the left side and on the right side of the intake port 4 is gradually increased toward downstream in the top view.

As shown in FIG. 4, according to this embodiment, both the inclined portions S of the outer side wall surface 44a and the center side wall surface 44b are formed approximately linearly in the top view. According to a modification, however, the inclined portions S of the outer side wall surface 44a and the center side wall surface 44b may be formed in curved shape in the top view.

(Advantageous Effects of Configuration of Intake Port According to Embodiment)

Figure 5:
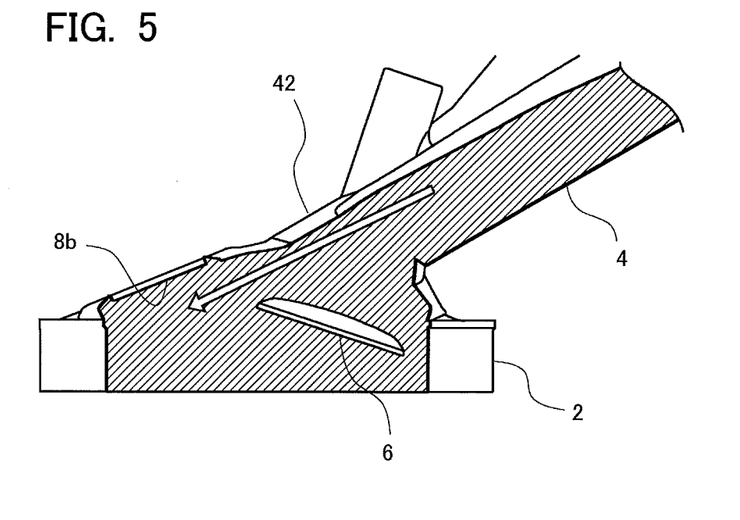
FIG. 5 is a diagram schematically illustrating the flow of the intake air from the intake port into a cylinder in the side view in the internal combustion engine according to the embodiment.

The following describes the advantageous effects of the configuration of the intake port according to this embodiment. FIG. 5 is a diagram schematically illustrating the flow of intake air from the intake port into the cylinder in the side view in the internal combustion engine according to the embodiment. FIG. 5 illustrates the state that the intake valve 6 is in the open position. FIG. 5 illustrates a vertical section at a location shifted from a plane including a center axis of a stem portion of the intake valve 6 toward the outer side of the cylinder 2. Accordingly, only a valve element of the intake valve 6 is illustrated, while the step portion is omitted from the illustration. In FIG. 5, an open arrow indicates the flow of the intake air from the intake port 4 into the cylinder 2.

According to this embodiment, the upper wall surface 42 of the intake port 4 is formed continuously from the upstream side end 41a of the valve contact surface 41 of the intake port 4 to be extended approximately linearly while inclined to the intake port-side ceiling surface 8a more downward than the normal direction L1 of the intake port-side ceiling surface 8a. This configuration causes the intake air flowing from upstream along the upper wall surface 42 of the intake port 4 to be guided by this approximately linearly formed portion of the upper wall surface 42 in the course of flowing into the cylinder 2. This makes the intake air flowing from the intake port 4 into the cylinder 2 more likely to flow toward the exhaust port side in the upper portion in the cylinder 2 as shown in FIG. 5. As a result, this increases the flow rate of the intake air flowing toward the exhaust port side in the upper portion in the cylinder 2.

Figure 6A:
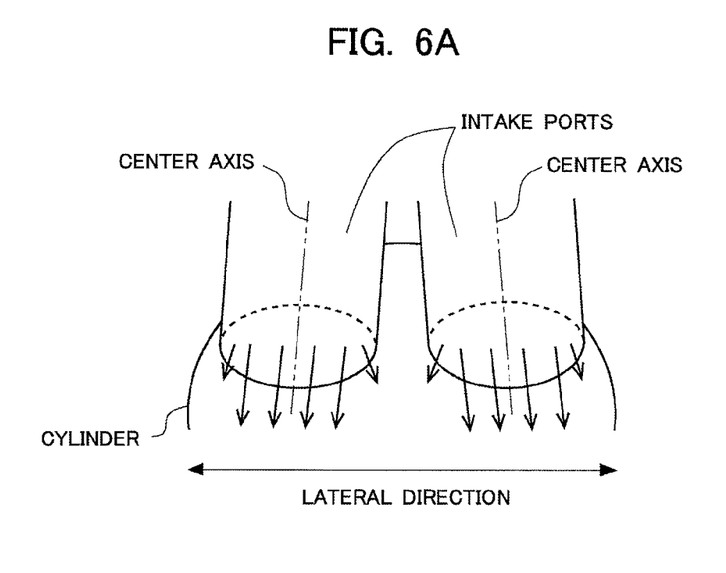
FIGS. 6A and 6B are diagrams schematically illustrating the flow of the intake air from the intake port into the cylinder in the top view in the internal combustion engine according to the embodiment and in an internal combustion engine employing a different configuration from that of the embodiment.
Figure 6B:
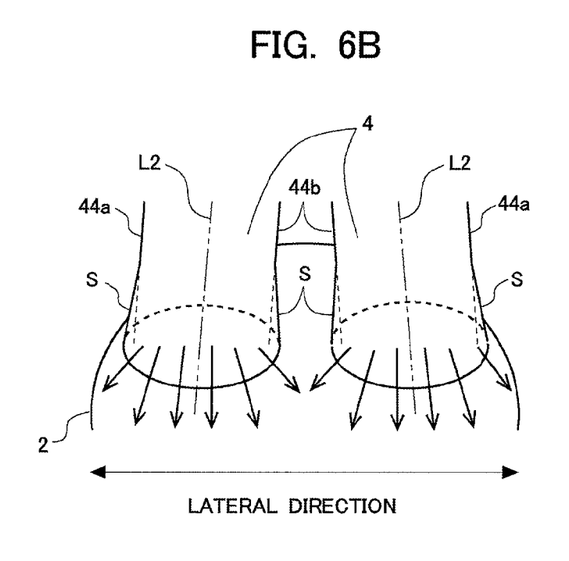

FIGS. 6A and B are diagrams schematically illustrating the flow of the intake air from the intake port into the cylinder in the top view in the internal combustion engine according to the embodiment and in an internal combustion engine employing a different configuration from that of the embodiment. FIG. 6A illustrates the flow of the intake air in the internal combustion engine employing the different configuration from that of the embodiment. In the illustrated configuration of FIG. 6A, lateral wall surfaces on the left side and on the right side of an intake valve are extended approximately parallel to each other in an area extended continuously from a valve contact surface of the intake port toward upstream (in other words, the intake port has no inclined portions S in the lateral wall surfaces). FIG. 6(b) illustrates the flow of the intake air in the internal combustion engine according to the embodiment. In FIGS. 6A and 6B, arrows indicate the flows of the intake air from the intake ports into the cylinders. The length of each arrow indicates the flow volume of the intake air.

As shown in FIG. 6A, in the configuration that the lateral wall surfaces on the left side and on the right side of the intake port are extended approximately parallel to each other in the vicinity of the opening of the intake port, the flow of the intake port flowing from the intake port into the cylinder is unlikely to be spread in the lateral direction in the upper portion in the cylinder. Accordingly, the intake air flowing from the intake port into the cylinder is unlikely to flow toward the bore wall surface (lateral bore wall surface) side located in the lateral direction of the cylinder or toward the cylinder center side. According to the embodiment, on the other hand, the inclined portions S are formed on the outer side wall surface 44a and on the center side wall surface 44b of the intake port 4 in the predetermined second area E2 that is continuously extended from the upstream side end 41a of the valve contact surface 41 of the intake port 4 as described above. This configuration causes the distance between the lateral wall surfaces 44 on the left side and on the right side of the intake port 4 (i.e., the distance between the outer side wall surface 44a and the center side wall surface 44b) to be gradually expanded to both the lateral bore wall surface side and the cylinder center side toward downstream. This configuration accordingly makes the flow of the intake air from the intake port 4 into the cylinder 2 likely to be spread in the lateral direction in the upper portion in the cylinder 2, as shown in FIG. 6(b). In other words, this configuration makes the intake air flowing from the intake port 4 into the cylinder 2 likely to flow both toward the lateral bore wall surface side and toward the cylinder center side. This accordingly increases the flow rate of the intake air flowing through the vicinity of the lateral bore wall surface toward the exhaust port side (bore wall surface-side intake air) and the flow rate of the intake air flowing through the vicinity of the center of the cylinder toward the exhaust port side (cylinder center-side intake air) in the upper portion of the cylinder 2.

Figure 7A:
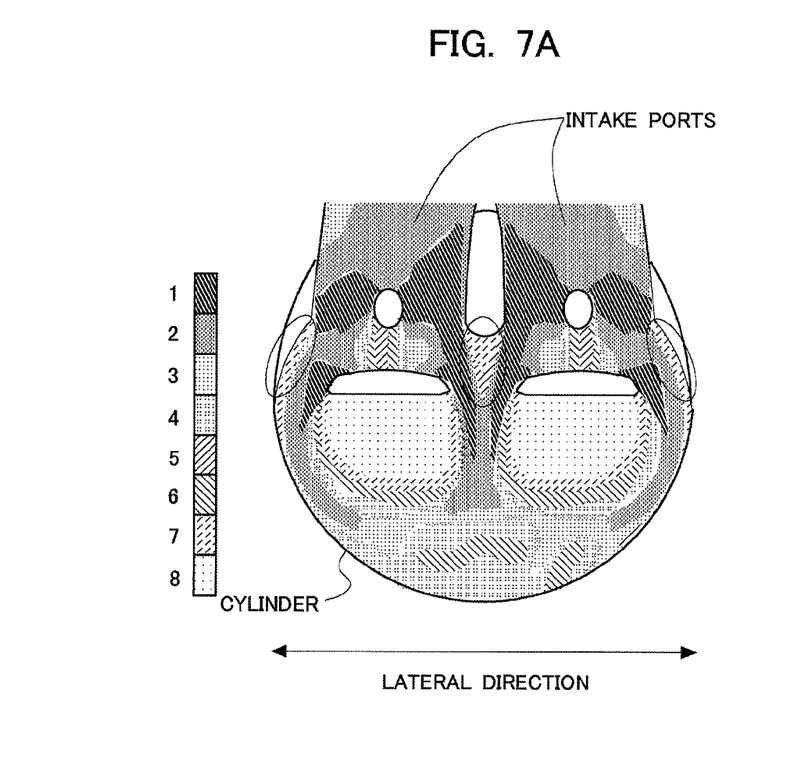
FIGS. 7A and 7B are diagrams illustrating distributions of the flow rate of the intake air in the course of flowing the intake air from the intake port into the cylinder in an upper portion of the cylinder in the internal combustion engine according to the embodiment and in the internal combustion engine employing the configuration shown in FIGS. 6A and 6B.
Figure 7B:
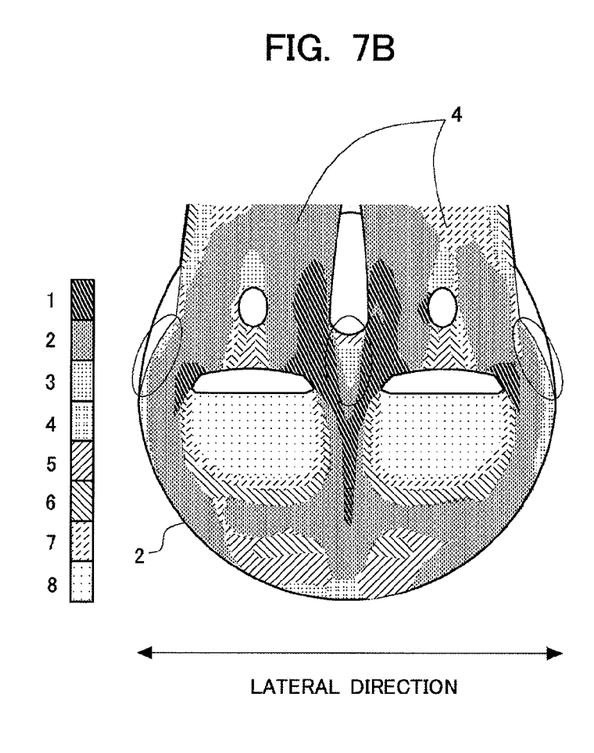

FIGS. 7A and B are diagrams illustrating distributions of the flow rate of the intake air in the course of flowing the intake air from the intake port into the cylinder in the upper portion of the cylinder in the internal combustion engine according to the embodiment and in the internal combustion engine employing the configuration shown in FIG. 6. FIG. 7A illustrates the distribution of the flow rate of the intake air in the internal combustion engine employing the configuration shown in FIG. 6A. FIG. 7(b) illustrates the distribution of the flow rate of the intake air in the internal combustion engine according to the embodiment. In FIGS. 7A and 7B, the distribution of the flow rate of the intake air is expressed by patterns 1 to 8. The flow rate of the intake air decreases in the order of the pattern 1 to the pattern 8 (in other words, the intake air in a location expressed by the pattern 1 has the highest flow rate and the intake air in a location expressed by the pattern 8 has the lowest flow rate).

According to the comparison between FIG. 7A and FIG. 7B, the distribution of FIG. 7B has the higher flow rate of the intake air flowing from the opening of the intake port toward the lateral bore wall surface side and the higher flow rate of the intake air flowing from the opening of the intake port toward the cylinder center side than the distribution of FIG. 7A (flow rates in elliptical areas in FIGS. 7A and 7B). This indicates that the intake air flowing from the intake port into the cylinder is more likely to flow toward the lateral bore wall surface side and toward the cylinder center side in the upper portion in the cylinder in the internal combustion engine of the embodiment, compared with that in the internal combustion engine employing the configuration shown in FIG. 6A. Additionally, according to the comparison between FIG. 7A and FIG. 7B, the distribution of FIG. 7A has the patterns of the relatively high flow rate more widely spread toward the exhaust port side both in the vicinity of the lateral bore wall surface and in the vicinity of the cylinder center, compared with the distribution of FIG. 7B. This indicates that the internal combustion engine of the embodiment has the higher flow rate of the bore wall surface-side intake air and the higher flow rate of the cylinder center-side intake air in the upper portion in the cylinder than the internal combustion engine employing the configuration shown in FIG. 6A.

As described above, the configuration of the embodiment can increase the flow rate of the intake air flowing toward the exhaust port side in the upper portion in the cylinder 2 over a wider range in the lateral direction in the cylinder 2. Increasing the flow rate of the intake air flowing toward the exhaust port side in the upper portion in the cylinder 2 results in increasing the flow rate of gas in a direction from the exhaust port-side ceiling surface toward the top face of the piston in the vicinity of the bore wall surface on the exhaust port side. Accordingly, the configuration of the intake port according to the embodiment enables the flow of the intake air flowing from the intake port 4 into the cylinder 2 to more effectively contribute to formation of the tumble flow in the cylinder 2. This configuration can thus intensify the tumble flow formed in the cylinder 2.

The internal combustion engine of the embodiment employs the configuration that the inclined portions S are formed on both the lateral wall surfaces 44 on the left side and on the right side (i.e., the outer side wall surface 44a and the center side wall surface 44b) in the predetermined second area E2 of the intake port 4 as described above. The internal combustion engine may, however, employ a modified configuration that the inclined portion S is formed only on either one of the outer side wall surface 44a and the center side wall surface 44b in the predetermined second area E2 of the intake port 4.

Figure 8:
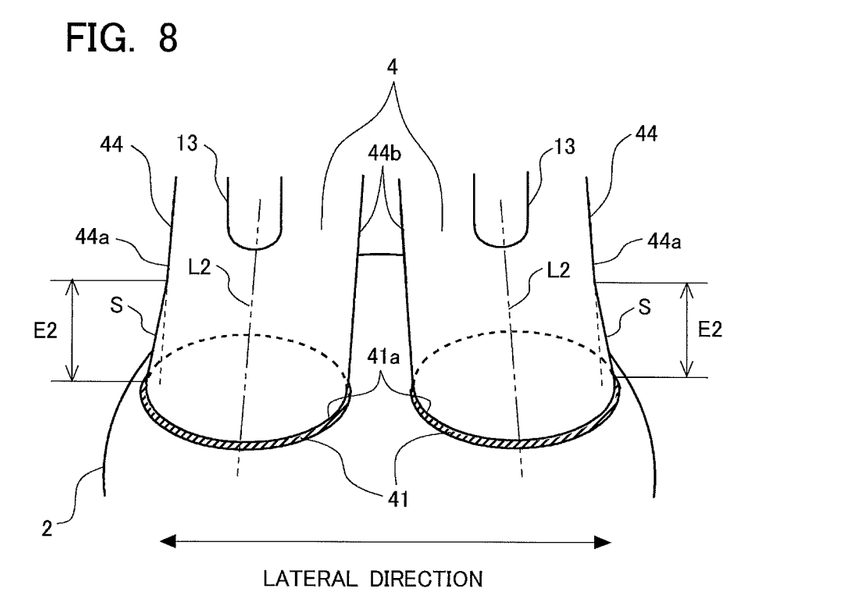
FIG. 8 is a top view illustrating peripheral part of the opening of an intake port according to a modification of the embodiment.

For example, as shown in FIG. 8, a modified configuration that is employable may be that the inclined portion S is formed only on the outer side wall surface 44a in the predetermined second area E2 of the intake port 4 and that the center side wall surface 44b is extended approximately parallel to the center axis L2 of the intake port 4. In this modified configuration, the distance between the lateral wall surfaces 44 on the left side and on the right side of the intake port 4 is also gradually expanded to the lateral bore wall surface side toward downstream in the predetermined second area E2 of the intake port 4. Accordingly the intake air flowing from the intake port 4 into the cylinder 2 is more likely to flow toward the lateral bore wall surface side in the upper portion in the cylinder 2. This can thus increase the flow rate of the bore wall surface-side intake air in the upper portion in the cylinder 2. As a result, this configuration can intensify the tumble flow formed in the vicinity of the lateral bore wall surface.

Figure 9:
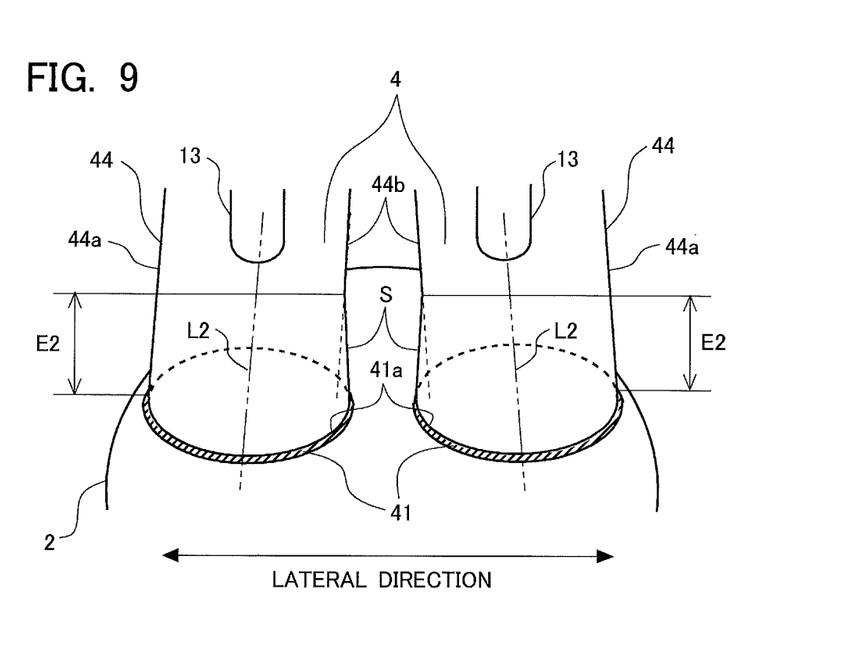
FIG. 9 is a top view illustrating peripheral part of the opening of an intake port according to another modification of the embodiment.

In another example, as shown in FIG. 9, another modified configuration that is employable may be that the inclined portion S is formed only on the center side wall surface 44b in the predetermined second area E2 of the intake port 4 and that the outer side wall surface 44a is extended approximately parallel to the center axis L2 of the intake port 4. In this modified configuration, the distance between the lateral wall surfaces 44 on the left side and on the right side of the intake port 4 is also gradually expanded to the cylinder center side toward downstream in the predetermined second area E2 of the intake port 4. Accordingly the intake air flowing from the intake port 4 into the cylinder 2 is more likely to flow toward the cylinder center side in the upper portion in the cylinder 2. This can thus increase the flow rate of the cylinder center-side intake air in the upper portion in the cylinder 2. As a result, this configuration can intensify the tumble flow formed in the vicinity of the cylinder center.

Employing the configuration that the inclined portions S are formed on both the lateral wall surfaces 44 on the left side and on the right side in the predetermined second area E2 of the intake port 4 can, however, increase both the flow rate of the bore wall surface-side intake air and the flow rate of the cylinder center-side intake air in the upper portion in the cylinder 2 as described above. Increasing both the flow rate of the bore wall surface-side intake air and the flow rate of the cylinder center-side intake air makes both the intake air flows more likely to reach the bore wall surface on the exhaust port side. After reaching the bore wall surface on the exhaust port side, both the bore wall surface-side intake air and the cylinder center-side intake air flow along the bore wall surface on the exhaust port side. In this configuration, these two intake air flows collide with each other at a location closer to the bore wall surface on the exhaust port side in the upper portion in the cylinder 2. This forms the gas flow in the direction from the exhaust port-side ceiling surface toward the top face of the piston at the location closer to the bore wall surface on the exhaust port side. As a result, this makes the gas flow going from the intake port side via the exhaust port-side ceiling surface 8b toward the top face of the piston 3 in the tumble flow formed in the cylinder 2 more likely to flow along the bore wall surface. This further expands the size of the vortex of the tumble flow formed in the cylinder 2. This can accordingly further intensity the tumble flow.

The internal combustion engine of the embodiment employs the configuration that both the predetermined first area E1 and the predetermined second area E2 in the intake port 4 are provided as the areas continuously extended from the upstream side end 41a of the valve contact surface 41 toward upstream as described above. More specifically, the intake port 4 is configured such that the upper wall surface 42 is extended approximately linearly to be continuous from the upstream side end 41a of the valve contact surface 41 toward upstream and that the inclined portions S of the lateral wall surfaces 44 are formed continuously from the upstream side end 41a of the valve contact surface 41. The predetermined first area E1 and the predetermined second area E2 may, however, not be necessarily provided as areas continuous from the upstream side end 41a of the valve contact surface 41. Even when the predetermined first area E1 and the predetermined second area E2 are arranged to be not adjacent to the upstream side end 41a of the valve contact surface 41, the configuration that the predetermined first area E1 is provided as an area in the vicinity of the opening of the intake port 4 and that the predetermined second area E2 is provided as an area included in the predetermined first area E1 still achieves the effect of guiding the flow of the intake air by the approximately linearly extended portion of the upper wall surface 42 and by the inclined portion S of the lateral wall surface 44 as described above. In other words, the configuration that the upper wall surface 42 of the intake port 4 in the vicinity of the opening of the intake port 4 is extended approximately linearly while being inclined to the intake port-side ceiling surface 8a more downward than the normal direction L1 of the intake port-side ceiling surface 8a and that the inclined portion S is formed on the lateral wall surface 44 of the intake port 4 in part of the approximately linearly extended area of the upper wall surface 42 provides the advantageous effect of intensifying the tumble flow as described above.

Employing the configuration of the intake port 4 such that the upper wall surface 42 is extended approximately linearly to be continuous from the upstream side end 41a of the valve contact surface 41 toward upstream and that the inclined portions S of the lateral wall surfaces 44 are formed continuously from the upstream side end 41a of the valve contact surface 41 as described above can, however, maximize the effect of guiding the intake air flowing from the intake port 4 into the cylinder 2 by the upper wall surface 42 and the lateral wall surface 44 described above. This configuration accordingly makes the intake air flowing from the intake port 4 into the cylinder 2 more likely to flow toward the exhaust port side in the upper portion in the cylinder 2. This configuration also makes the flow of the intake air from the intake port 4 into the cylinder 2 more likely to be spread in the lateral direction in the upper portion in the cylinder 2. This can thus further increase the flow rate of the bore wall surface-side intake air or the cylinder center-side intake air in the upper portion in the cylinder 2. This can accordingly maximize the advantageous effect of intensifying the tumble flow.

In a conventional configuration, a ring-shaped valve seat made of a material having the higher wear resistance than that of the material of a cylinder head is fit in the opening of an intake port. A valve contact surface is formed on an inner circumferential surface of the valve seat. The valve seat, however, has relatively low flexibility in processing. In the case where the valve seat is employed, there may be a difficulty in processing an upper wall surface and a lateral wall surface extended continuously from an upstream end face of the valve contact surface of the intake port toward upstream to the configuration of the above embodiment. Accordingly, with regard to the intake port of the embodiment, it is preferable not to provide a conventional insert-type valve seat at the opening of the intake port but to employ a so-called laser clad valve seat provided by laser welding alloy powder at a location of the cylinder head where the opening of the intake port is formed. Employing this laser clad valve set increases the flexibility in processing a portion that is extended continuously from the upstream end face of the valve contact surface of the intake port toward upstream. This can thus achieve the configuration of the intake port of the embodiment. The technique employed in the invention to achieve the configuration of the intake port is, however, not limited to the laser clad valve seat.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-050082, filed on Mar. 12, 2015, which is hereby incorporated by reference herein in its entirety.

REFERENCE SIGNS LIST 1 internal combustion engine
2 cylinder
3 piston
4 intake port
41 valve contact surface
42 upper wall surface
43 lower wall surface
44 lateral wall surface
44a outer side wall surface
44b center side wall surface
5 exhaust port
6 intake valve
61 stem portion
62 valve element
7 exhaust valve
8 combustion chamber
8a intake port-side ceiling surface
8b exhaust port-side ceiling surface

What is claimed is:

1. An internal combustion engine comprising a pent-roof type combustion chamber in which an intake port-side ceiling surface with an opening of an intake port and an exhaust port-side ceiling surface with an opening of an exhaust port are inclined to a plane that is perpendicular to a center axis of a cylinder, wherein
  a tumble flow is formed in the cylinder to cause a gas to flow in a direction from the exhaust port-side ceiling surface toward a top face of a piston in a neighborhood of a bore wall surface on an exhaust port side and to flow in a direction from the top face of the piston toward the intake port-side ceiling surface in a neighborhood of a bore wall surface on an intake port side, wherein
  an upper wall surface of the intake port is extended approximately linearly while being inclined to the intake port-side ceiling surface more downward than a normal direction of the intake port-side ceiling surface in a side view, in a predetermined area in vicinity of an opening of the intake port to the combustion chamber, and
  a distance between lateral wall surfaces on a left side and on a right side of the intake port is gradually increased toward downstream in a top view, in a partial area in the predetermined area of the intake port.

2. The internal combustion engine according to claim 1, wherein a distance between each of the lateral wall surfaces on the left side and on the right side of the intake port and a center axis of the intake port is gradually increased toward downstream in the top view, in the partial area in the predetermined area of the intake port.

3. The internal combustion engine according to claim 2, wherein a valve contact surface which a valve element of an intake valve comes into contact with in a closed position of the intake valve is formed at the opening of the intake port to the combustion chamber, and
  the predetermined area of the intake port is an area that is extended continuously from an upstream side end of the valve contact surface toward upstream, and the partial area is an area that is extended continuously from the upstream side end of the valve contact surface toward upstream in the predetermined area.

4. The internal combustion engine according to claim 1, wherein a valve contact surface which a valve element of an intake valve comes into contact with in a closed position of the intake valve is formed at the opening of the intake port to the combustion chamber, and
  the predetermined area of the intake port is an area that is extended continuously from an upstream side end of the valve contact surface toward upstream, and the partial area is an area that is extended continuously from the upstream side end of the valve contact surface toward upstream in the predetermined area.

\* \* \* \* \*